United States Patent [19]

McCune, Jr. et al.

[11] Patent Number: 5,466,906

[45] Date of Patent: Nov. 14, 1995

[54] PROCESS FOR COATING AUTOMOTIVE ENGINE CYLINDERS

[75] Inventors: Robert C. McCune, Jr., Southfield, Mich.; Michael R. Kim, Marlton, N.J.; Ronald W. Smith, Blue Bell, Pa.

[73] Assignee: Ford Motor Company, Dearborn, Mich.

[21] Appl. No.: 225,277

[22] Filed: Apr. 8, 1994

[51] Int. Cl.⁶ .................................................. B23K 10/00
[52] U.S. Cl. ................................ 219/121.47; 219/76.16; 219/121.59; 219/121.52; 427/446; 427/449
[58] Field of Search .................... 219/121.47, 76.15, 219/76.16, 121.59, 121.53, 121.52, 121.48; 427/569, 446, 449

[56] References Cited

U.S. PATENT DOCUMENTS

| | | | |
|---|---|---|---|
| 3,312,566 | 4/1967 | Winzeler et al. | 219/121.47 |
| 4,818,837 | 4/1989 | Pfender. | |
| 4,970,364 | 11/1990 | Müller. | |
| 5,019,429 | 5/1991 | Moskowitz et al.. | |
| 5,080,056 | 1/1992 | Kramer et al.. | |
| 5,144,110 | 9/1992 | Marantz et al.. | |
| 5,154,943 | 10/1992 | Etzkorn et al.. | |
| 5,194,304 | 3/1993 | McCune, Jr. et al. | 427/449 |
| 5,226,975 | 7/1993 | Denton et al.. | |
| 5,245,153 | 9/1993 | Singer et al. | 219/76.15 |
| 5,296,667 | 5/1994 | Marantz et al. | 219/121.47 |

OTHER PUBLICATIONS

B. Champagne and R. Angers "REP Atomization Mechanisms" Powder Metallurgy International vol. 16, No. 3, 1984.
Robert C. Tucker, Jr. "Plazma and Detonation Gun Deposition Techniques and Coating Properties" Deposition Technologies for Films and Coatings, pp. 454–489.
I. A. Fisher "Variables Influencing the Characteristics of Plasma–Sprayed Coatings" International Metallurgical Reviews, 1972, vol. 17.
B. Champagne and R. Angers "Fabrication of Powders by the Rotating Electrode Process" The International Journal of Powder Metallurgy & Powder Technology, vol. 16, No. 4, 1980.

Primary Examiner—Mark H. Paschall
Attorney, Agent, or Firm—David B. Kelley; Roger L. May

[57] ABSTRACT

A method for coating the internal cylinder bores of a cast aluminum engine block comprising the steps of casting an engine block of aluminum alloy, thermally spraying a wear-resistant coating onto cylinder walls in the engine block by melting the tip of a rotating iron-based alloy rod with a plasma torch within cylinders in the engine block, and honing the cylinder walls to a chosen size.

15 Claims, 1 Drawing Sheet

PROCESS FOR COATING AUTOMOTIVE ENGINE CYLINDERS

FIELD OF THE INVENTION

This invention relates to wear-resistant coatings, and more particularly, to a process for applying a wear-resistant coating to the inner diameters of automotive engine cylinder bores.

BACKGROUND OF THE INVENTION

The auto industry has long sought to use lightweight materials as the base material for engine blocks so as to reduce overall vehicle weight and thus enhance fuel efficiency. Use of such materials (e.g., aluminum and its alloys) for automotive componentry such as engine heads and blocks often requires the incorporation of insert materials such as steel or cast iron to provide wear resistance which is not attainable with the lighter material on contact surfaces such as valve seats and cylinder bores. In particular, aluminum engine blocks require some type of wear-resistant surface on the cylinder bores, for example, to accommodate the sliding action of the piston sealing rings.

Previous approaches to this problem have been to use cast-in-place iron or steel liners in the cylinder bores, or to fashion the engine block out of materials such as the 390-type aluminum alloys, wherein a high fraction of primary silicon particles at the surface of the material provides the necessary wear resistance. Liners were found to be too heavy, limited heat conduction to the water jacket, required specialized facilities for either casting in place or inserting in the engine block, and were expensive to install. The use of 390 alloy for engine blocks, while solving the wear resistance problem, introduces other problems, such as difficulty in machining the material and specialized steps required to produce the most desirable wear surface.

Other approaches to the cylinder bore surfacing problem for aluminum alloys have used an electrodeposition process to produce layers which incorporate silicon carbide particles into a nickel matrix, such as the Nikasil process (registered trademark of the Mahle Company). The drawback of this technique is the complexity of the process for selective plating of engine cylinders requiring either localized deposition or extensive and elaborate masking. Wear-resistant coatings have also been deposited on engine parts using chemical vapor deposition (CVD) techniques, as disclosed in U.S. Pat. No. 5,226,975 (Denton et al.). These processes, however, can require 10 to 60 hours for a satisfactory coating to be deposited and thus are far too slow for assembly line purposes Thermal spraying systems represent another approach to applying wear-resistant coatings to cylinder bore surfaces at processing rates significantly greater than other coating processes, such as CVD. These systems in general rely on a combination of heat and momentum to cause droplets of the coating material to conform and bond to the surface being coated. Different thermal spraying systems employ varied methods of imparting heat and momentum to a stream of droplets which will form the coating. One such system is the high velocity oxy-fuel (HVOF) process, such as disclosed in U.S. Pat. No. 5,019,429 (Moskowitz et al.). In the HVOF process, droplets attain a high velocity with high pressure gas as a transport medium and bond through plastic deformation upon impact with the coated surface. HVOF has been used for coating engine cylinder bores, as disclosed in U.S. Pat. No. 5,080,056 (Kramer et al.). The HVOF process, however, is slow (60 grams/minute), noisy (transport gases flow at supersonic speeds), and produces excessive heat which must often be dissipated from the workpieces by ancillary cooling schemes.

Another thermal spraying method, plasma spraying, uses a plasma arc to heat gases which heat and accelerate a droplet stream which is directed at a substrate rotating around a plasma torch by high pressure gas, as disclosed in U.S. Pat. No. 4,970,364 (Muller). Droplet velocities are lower than in the HVOF process but are heated to a higher temperature so that they are in a molten state upon reaching the substrate in order to provide a good bond. Other thermal atomization techniques, such as those used for powder production (*Fabrication of Powders by the Rotating Electrode Process*, Champagne and Angers, The International Journal of Powder Metallurgy & Powder Technology, Volume 16, No. 4, 1980), use a rotating rod of the feedstock material to impart momentum to the melted droplets. Powder production processes, however, are inadequate to form the required cylinder bore coating.

SUMMARY OF THE INVENTION

The present invention provides a rotating electrode coating process for depositing a wear-resistant coating at a high rate onto the inner surfaces of cylindrical objects, such as automotive engine cylinder bores. In particular, a method is disclosed for making an aluminum alloy automotive engine block comprising the steps of casting an engine block of aluminum alloy, depositing a wear-resistant coating onto cylinder walls in the engine block by melting the tip of a rotating rod, made of an iron-based alloy or other comparable composite material, with a plasma torch within the engine block cylinders, and finishing the cylinder walls to a chosen size and surface topography by conventional boring and honing practices.

The wear-resistant coating, which preferably is of an iron-based or steel alloy, is applied by one preferred method to the inner wall of a cylinder in an aluminum alloy engine block by positioning a transferred arc torch within the cylinder, striking an arc between the torch and a consumable rod, made of an iron-based alloy or other comparable composite material, such that the arc end of the rod melts, rotating the rod to eject a diametral spray pattern of molten droplets from the arc end of the rod to the cylinder inner diameter, and translating the rod and the torch generally along the central axis of the cylinder such that the ejected droplets impact the wall of the cylinder in a molten state to form an evenly distributed coating on the cylinder.

Preferably, a plasma heated process is used in which a plasma arc is struck between the torch and the rod with an argon-oxygen gas mixture used to produce the plasma gas, preferably at a rate of approximately 24 to 32 liters of argon per minute and oxygen at a rate of 11 to 17 liters per minute. The torch is preferably cooled with argon gas, and by partially enclosing the cylinder during deposition of the coating the plasma gas and the cooling gas may purge the cylinder and thus control the atmosphere therein. It has been found that good results are achieved when a steel alloy rod, for example, AISI 1045 steel, having a mean diameter of between approximately 10 mm and 20 mm, is melted by the plasma arc and rotated at a velocity of between approximately 14,000 rpm and 18,000 rpm to produce a deposition rate of at least 195 grams per minute.

In addition to using a plasma transferred arc apparatus for melting the feedstock rod, other apparati for producing intense heat may also be used, such as lasers, electron beams, and flames. Furthermore, any metal or conductive composite material capable of conducting a transferred arc may be used as the feedstock for the process. Grey iron is a desirable feedstock material due to the self-lubricating aspects of the incorporated graphite.

Thus, an object of the present invention is to produce a wear-resistant coating, such as cast iron or steel, on an aluminum cylinder bore surface by a plasma rotating electrode thermal spray process.

A further object is to provide a high deposition rate method for coating cylinder bores of an internal combustion engine.

Another object of the present invention is to provide a method to thermally spray wear-resistant coatings onto an aluminum engine block cylinder bore which is feasible from both a technical and manufacturing standpoint in the sense of being able to be incorporated into an online engine build facility.

DETAILED DESCRIPTION OF THE PREFERRED EMBODIMENTS

Figure 1:
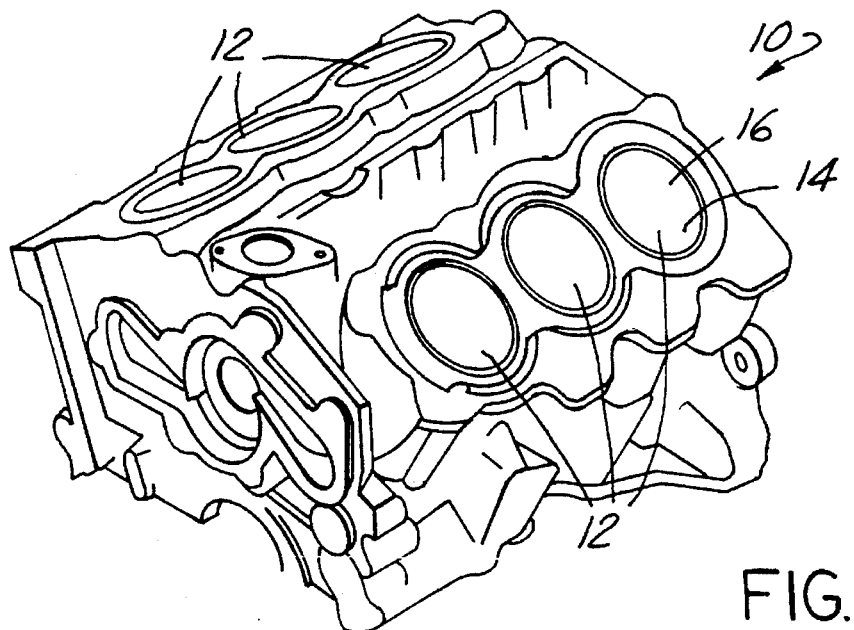
FIG. 1 is a perspective view of an aluminum alloy engine block showing the cylinders as conventionally arranged.

An engine block 10 cast of an aluminum alloy, for example type 319, is shown in FIG. 1 having six cylinders 12, three on either side of engine block 10. Each cylinder 12 has a cylinder bore 14 into which a piston (not shown) will be fitted for operation in the conventional internal combustion engine sense. To prevent wear of bore 14 by the piston and its sealing rings, a wear-resistant coating 16 is applied using a rotating electrode coating process as further described below.

Figure 2:
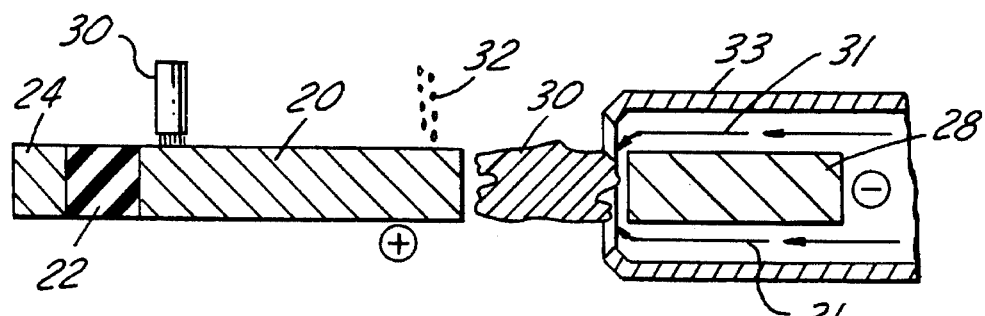
FIG. 2 is a schematic representation of the rotating electrode coating method of the present invention.

FIG. 2 illustrates the basic concept of powder production and thermal spraying, which, as discussed below, is modified for the present invention. The coating material to be deposited on cylinder bore 14 is formulated into a rod 20 which provides the feedstock. The coating material of rod 20 is both electrically conductive and can be melted, such as AISI 1045 steel and, additionally, does not volatilize directly. Insulator 22 electrically isolates rod 20 from connecting boss 24 which is attached to motor 26 (FIG. 3) which provides rotation. Speeds of up to 20,000 rpm can be used, with rods of up to 4 cm in diameter. A non-consumable electrode 28 provides the counter electrode, and an arc 30 is struck between the electrodes (rod 20 and electrode 28), and a plasma jet is formed with gases 31 routed by shield 33 to flow between the electrodes. Molten material formed on the surface of rod 20 is ejected by centrifugal force and forms a droplet spray 32. Brush 34 provides the electrical contact to the rotating electrode, which, in FIG. 2, is rod 20.

Figure 3:
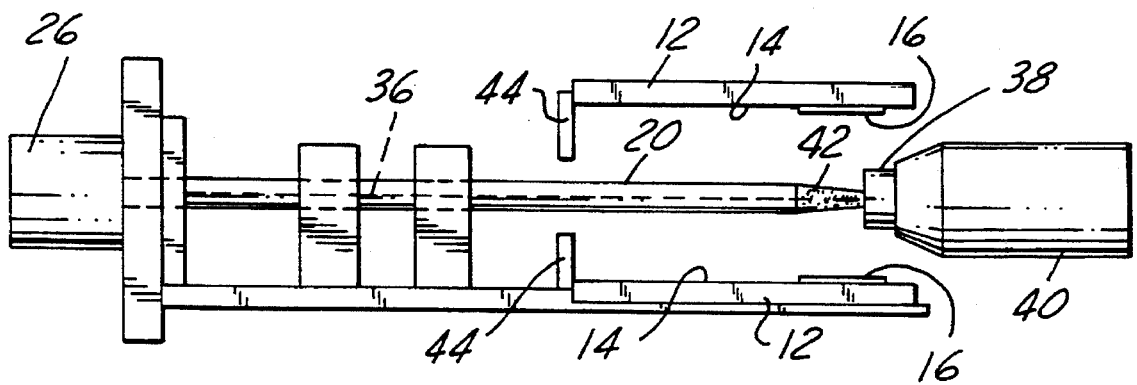
FIG. 3 is a schematic diagram of the apparatus used for applying a wear-resistant coating to a cylinder of an engine block using the rotating electrode coating method of the present invention.

The two-electrode arc process shown in FIG. 2 can typically only deliver a limited amount of superheating to the molten droplet spray 32 which, while sufficient for powder production, is insufficient for producing low porosity coatings on cylinder bores. To provide additional heating of the ejected droplets, a plasma-based torch is used to replace the non-consumable electrode 28, as shown in FIG. 3. Typical plasma torch configurations (not shown) include the transferred arc, in which the surface of feedstock rod 20 acquires a positive charge relative to the gun cathode, with a neutral or grounded nozzle, and a non-transferred arc or torch, in which the nozzle becomes the anode. For applying metal alloy coatings to cylinder bores, a transferred arc plasma torch 38 has been used in conjunction with electrical isolation of feedstock rod 20, as is further described below.

The preferred arrangement for cylinder bore coating is illustrated in FIG. 3. The consumable feedstock rod 20 rotates at a high rate of speed, preferably between 14,000 rpm and 18,000 rpm, so that ejected molten droplet spray 32 (FIG. 2) travels under the influence of centrifugal force to the cylinder bore 14 to form coating 16 thereon. Maximum rotational speeds of rod 20 would be on the order of 20,000 rpm. Rod 20 can translate along cylinder center axis 36 in association with movement of the transferred plasma-arc torch 38 as material is consumed to form coating 16. Plasma-arc torch 38, which is, for example, a modified Thermal Dynamics PCM-100 plasma transferred arc cutting torch, can be used to achieve melting of consumable anode rod 20. Head assembly 40 contains torch 38, conduits (not shown) for transmitting gas (typically argon or some inert gas) to torch 38, electrical connections to torch 38, and conduits (not shown) for routing plasma gas and cooling fluid gas to torch 38.

Plasma plume 42 is generated by torch 38 and is projected onto the end of the rotating feedstock rod 20. The heated gases from plasma plume 42 aid in superheating ejected molten droplet spray 32 from feedstock rod 20 and may also provide additional gaseous flow to transport spray 32 to cylinder bore 14. The centrifugal force of rotating rod 20, however, is the main driving force for producing the thermal spray morphology of the resulting coating 16.

Other intense and concentrated heat sources could alternatively be used to melt rotating rod 20, such as lasers, electron beams, and flames. Referring again to FIG. 3, head assembly 40 can contain a laser 38 which generates laser beam 42 directed at rod 20. Droplet spray 32 is formed as discussed above when rod 20 melts and is rotated to eject the molten droplets. Likewise, head 40 can contain an electron beam generator 38 which generates an electron beam 42 to melt rod 20.

Consumable feedstock rod 20, which is melted to form droplet spray 32, preferably is an iron-base or steel alloy, but could include other metals and composites which are electrically conductive and not volatilized by the plasma 42. Essentially, any metal or conductive composite material capable of conducting a transferred arc may be used as the feedstock rod 20 for the process. Grey iron, which for purposes of this disclosure is an iron-based alloy, would be advantageous as feedstock rod 20 due to the self-lubricating aspects of the incorporated graphite. Grey iron has been used in conventional liners with the graphite droplets acting to minimize scuffing while also providing pockets for oil retention. Gases for nitriding or carburizing could also be fed through rod 20 or as the plasma forming gases.

Torch 38 is operated using a plasma preferably comprising a combination of argon and another diatomic gas. Combinations of argon/oxygen, argon/nitrogen, and argon/hydrogen may be employed. Argon is preferably used as the cooling gas. Table 1 indicates typical gas flows for torch 38 operation.

TABLE 1

Plasma gas compositions and flow rates.

| Plasma Gas | Cooling Gas |
|---|---|
| 1. $N_2$: 14 l/min<br>Ar: 28 l/min | Ar: 140 l/min |
| 2. $H_2$: 14 l/min<br>Ar: 28 l/min | Ar: 140 l/min |
| 3. $O_2$: 14 l/min<br>Ar: 28 l/min | Ar: 140 l/min |

The ratio of diatomic gas to inert gas may be altered to have the diatomic gas comprise up to 80% of the plasma.

The ends 13 of substrate cylinder 12 are preferably partially enclosed during the coating process to allow the plasma and cooling gases to purge the cylinder and control the atmosphere. End section 44 is attached for that purpose (FIG. 3). Failure to control the atmosphere may cause droplet spray 32 to travel through air during flight to cylinder bore 14, resulting in oxidation of the droplets. The effects of plasma gas upon droplet size and coating 16 structure have been evaluated using the three gas compositions shown above in Table 1. The mean droplet size for each plasma gas combination is given below in Table 2.

TABLE 2

Mean droplet size vs. plasma gas.

| Plasma Gas | Mean Droplet Size (um) |
|---|---|
| Ar/$N_2$ | 247 |
| Ar/$H_2$ | 247 |
| Ar/$O_2$ | 209 |

Coating 16 deposit rates for the plasma rotating electrode process of the present invention are shown in Table 3.

TABLE 3

Melt rate vs. plasma gas.

| Plasma gas | Melt rate |
|---|---|
| Ar/$N_2$ | 157 gm/min |
| Ar/$H_2$ | 142 gm/min |
| Ar/$O_2$ | 195 gm/min |

The highest melt rate, 195 gm/min, occurred when using argon/oxygen plasma. Melt rates for all plasma gases investigated are highly favorable when compared with typical deposition rates of 40–60 grams/min for conventional thermal spray processes such as air plasma spray (APS), high velocity oxy-fuel (HVOF) and wire-arc. With the demonstrated coating rates in Table 3, the method of the present invention can be used satisfactorily in manufacturing settings for coating the internal cylinder bores of an aluminum cast engine block with a wear-resistant coating.

To achieve good adhesion of coating 16, cylinder 12 is prepared for coating by blasting cylinder bore 14 with chilled iron shot. Alternatively, cylinder bore 14 is grit blasted with an appropriate abrasive material, such as number 12 alumina, at between 60 psi and 95 psi prior to spray depositing the coating 16 on bore 14. Other cylinder bore 14 preparation methods known to those skilled in the art and suggested by this disclosure can be also be used.

Although the preferred embodiment of the present invention has been disclosed, various changes and modifications may be made without departing from the scope of the invention as set forth in the appended claims.

We claim:

1. A method for applying a wear-resistant coating to the inner wall of a cylinder, the method comprising the steps of:
   positioning a transferred arc torch within said cylinder;
   introducing an argon oxygen gas mixture at the rate of approximately 28 liters per minute argon gas and 14 liters per minute oxygen gas for production of a plasma gas;
   striking a plasma arc between said torch and a consumable feedstock rod, such that the arc end of said rod melts;
   rotating said rod to eject molten droplets from said arc end of said rod to said cylinder inner diameter; and
   translating said rod and said torch generally along the central axis of said cylinder such that said droplets impact the wall of said cylinder in a molten state to form an evenly distributed coating on said cylinder.

2. A method according to claim 1, further including the step of cooling said torch with argon gas.

3. A method according to claim 2, further including the step of partially enclosing said cylinder during deposition of said coating to allow said plasma gas and said cooling gas to purge said cylinder and control the atmosphere therein.

4. A method according to claim 1, further including the step of rotating a cast iron rod having a diameter of between approximately 10 mm and 20 mm at a velocity of between approximately 14,000 rpm and 18,000 rpm.

5. A method according to claim 1, further including the step of rotating a rod made of AISI 1045 steel having a diameter of between approximately 10 mm and 20 mm at a velocity of between approximately 14,000 rpm and 18,000 rpm.

6. A method according to claim 1, further including the step of melting said rod at a rate such that a coating is deposited on said cylinder at a rate of at least 195 grams per minute.

7. A method according to claim 1, further including the step of preparing said cylinder wall prior to depositing said coating by blasting said cylinder wall with chilled iron shot.

8. A method according to claim 1, wherein a laser is positioned within said cylinder and a laser beam is directed between said laser and said rod, such that the laser end of said rod melts.

9. A method according to claim 1, wherein said wear-resistant coating and said rod comprise an iron-based alloy.

10. A method for making an aluminum alloy automotive engine block comprising the steps of casting an engine block of aluminum alloy, thermally spraying a wear-resistant coating onto cylinder walls in said engine block by melting the tip of an iron-based alloy rod rotating between approximately 14,000 rpm and 18,000 rpm with a plasma torch within cylinders in said engine block, and boring and honing said cylinder walls to a chosen size and surface finish.

11. A method according to claim 10, further including the step of introducing an argon-oxygen gas mixture to produce the plasma gas in said plasma torch.

12. A method according to claim 11, further including the step of introducing argon gas at a rate of approximately 28 liters per minute and oxygen at a rate of 14 liters per minute.

13. A method according to claim 10, further including the step of cooling said plasma torch with argon gas.

14. A method according to claim 13, further including the step of melting and rotating a rod comprised of grey iron alloy.

15. A method according to claim 13, further including the step of melting and rotating a rod comprised of cast iron.

\* \* \* \* \*